No. 777,287. PATENTED DEC. 13, 1904.
W. R. JONES.
MACHINE FOR PICKING PEANUTS.
APPLICATION FILED APR. 5, 1904.
NO MODEL. 2 SHEETS—SHEET 1.

Witnesses
Inventor
Willis R Jones
by
Foster, Freeman & Watson,
Attorneys

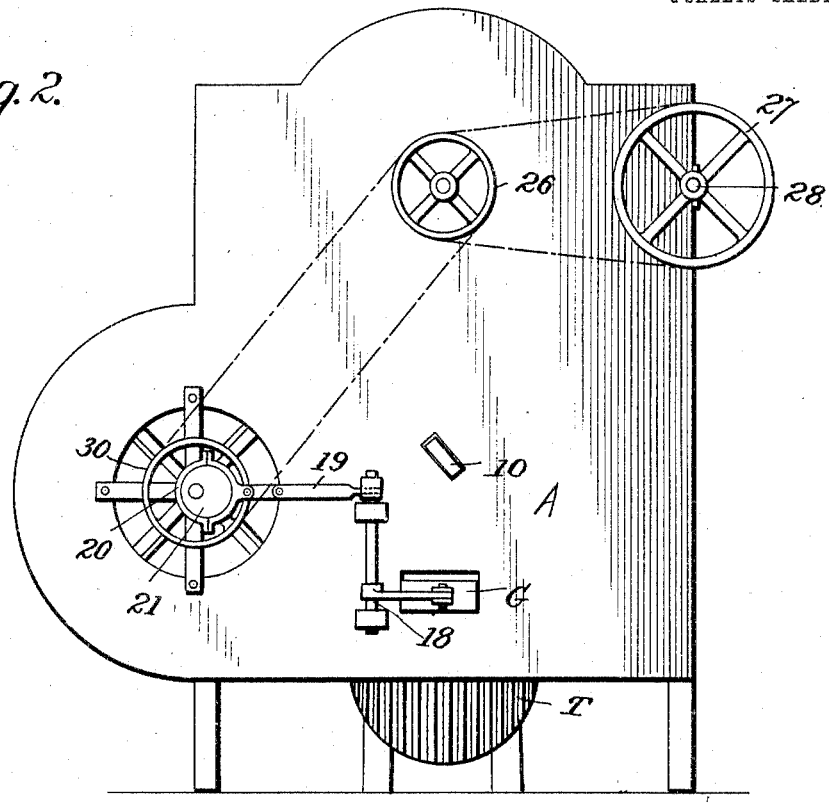
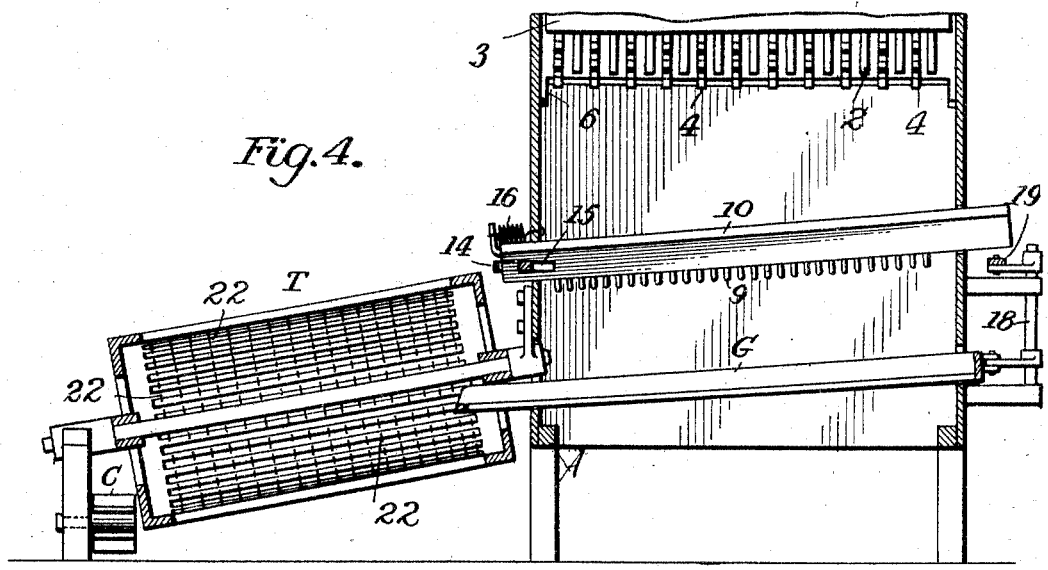

No. 777,287.

Patented December 13, 1904.

UNITED STATES PATENT OFFICE.

WILLIS R. JONES, OF SMITHFIELD, VIRGINIA, ASSIGNOR OF ONE-HALF TO THOMAS N. JONES, OF SMITHFIELD, VIRGINIA.

MACHINE FOR PICKING PEANUTS.

SPECIFICATION forming part of Letters Patent No. 777,287, dated December 13, 1904.

Application filed April 5, 1904. Serial No. 201,783. (No model.)

*To all whom it may concern:*

Be it known that I, WILLIS R. JONES, a citizen of the United States, residing at Smithfield, Isle of Wight county, State of Virginia, have invented certain new and useful Improvements in Machines for Picking Peanuts, of which the following is a specification.

This invention relates to machines for separating peanuts from the vines, and has for its object the provision of improvements in such machines, as will be hereinafter described.

Figure 1:
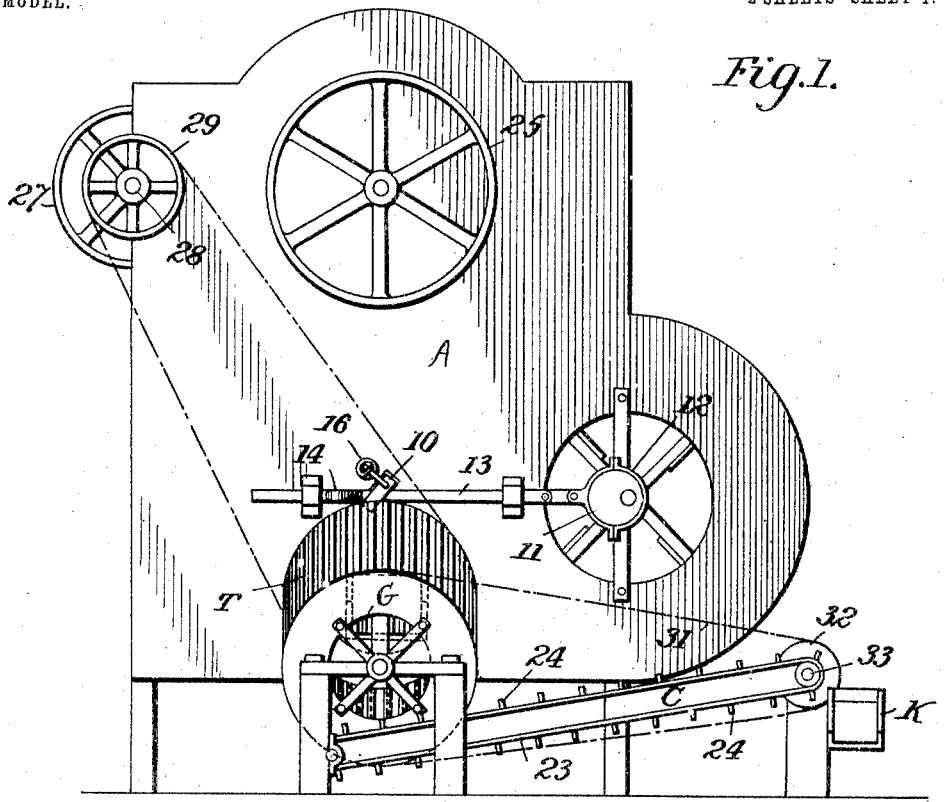
Figure 3:
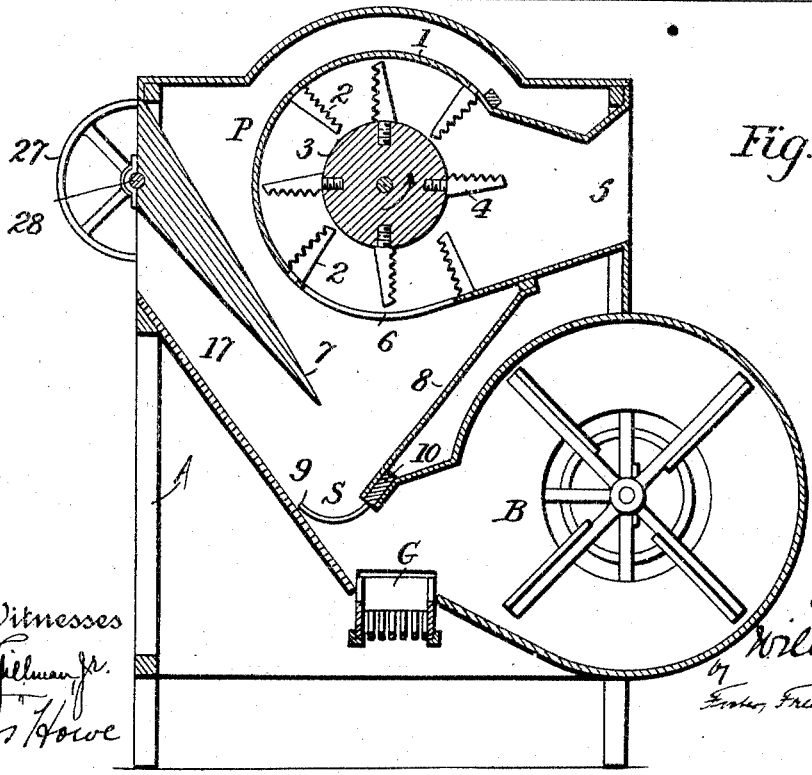

In the accompanying drawings, Figure 1 is a side elevation of the improved machine. Fig. 2 is an elevation of the other side of the machine. Fig. 3 is a vertical longitudinal section; and Fig. 4 is a vertical transverse section, some of the parts being broken away.

The improved machine comprises a frame A, on which is suitably supported a picker P for separating nuts from the vines, an intercepting means, which is preferably movable, for the vines as they are delivered from the picker, such as a grating S, which is movably mounted in the frame A, a suitable means for agitating the intercepting means, a blower B, the blast from which is directed through the intercepting means S, a sieve G, into which the nuts fall from the intercepting means, means for agitating the sieve, a tumbler T for stemming the peanuts which receives the nuts from the sieve and delivers them to a conveyer C, which carries the nuts to a chute K, by which they are delivered to a proper receptacle.

The picker P comprises a casing 1, in which toothed projections 2 are secured at regular intervals, and a rotatable cylinder 3, which carries toothed projections 4, similar to those upon the casing, the projections 4 of one set passing between the projections 2 of the other set. Material consisting of vines with the nuts attached thereto as they are brought from the field may be fed to the picker through an opening 5, and after the nuts have been stripped from the vines, which action is greatly facilitated by the teeth upon the projections, the whole is discharged through the opening 6 in the casing whence it falls, being guided by guide-plates 7 and 8 upon the intercepting means S, which in this case consists of upwardly-bent tines 9, secured to a bar 10, which is so mounted in the sides of the frame A that it may reciprocate therein.

The grating S may be reciprocated by any suitable means; but it is preferred that it be operated from an eccentric 11 upon the blower-shaft, the strap 12 of the eccentric being connected to a thrust-rod 13, supported in suitable guides and carrying a cam 14, which as it works back and forth under the influence of the rotation of the blower-shaft engages with a projection 15 from the bar 10 and forces said projection outwardly against the tension of a spring 16, so that the grating is agitated, thus facilitating the separation of the nuts from the vines. The blast from the blower B passes upwardly through the grating and carries the vines and other light portions upwardly through the passage or chute 17, whence they are discharged from the machine. The good nuts and other heavy portions fall through the tines 9 and are directed onto the sieve G, which may be agitated by means of a rock-shaft 18, connected by cranks to the sieve and to a connecting-rod 19, which in turn is connected to the strap 20 of an eccentric 21, fixed upon the opposite end of the blower-shaft from the eccentric which agitates the intercepting means S. The heavier and smaller particles, as stones, dirt, &c., pass through the sieve, while the nuts are discharged into the tumbler T, which consists of a perforated rotatable cylinder, which perforations preferably extend lengthwise of the cylinder, so as to give it the appearance of being composed of slats. Upon the interior of the cylinder are numerous projections 22, which facilitate the agitation of the nuts and aid in breaking off from them the stems, which then fall through the perforations. The nuts on arriving at the lower end of this cylinder have in their passage through the machine been separated from the vines and cleared from all admixture of trash and have been stemmed. They may now be delivered upon the conveyer C, which may consist of an endless belt 23, provided with cleats 24, and whereby the nuts are carried to and emptied into the discharge-chute K.

The cylinder 3 is preferably driven in the direction of the arrow by any suitable means, such as a power-belt upon the pulley 25, fixed to the shaft of the cylinder. Upon the opposite end of the shaft is a pulley 26, from which may be driven a pulley 27, fixed to the shaft 28, which extends to the other side of the machine and at its other end carries a pulley 29, from which the tumbler T may be driven. The blower may also be driven from the pulley 26 by means of a pulley 30, fixed to its shaft. The conveyer may be driven by means of a belt 31, extending from the outward end of the tumbler to a pulley 32, secured to a shaft 33, by means of which the conveyer is driven.

Without being limited to the construction shown and described, what I claim as new, and desire to secure by Letters Patent, is—

1. In a peanut-picking machine, the combination with the picker comprising the casing 1 having a feed-opening 5 and a discharge-opening 6, the said opening 6 being adapted to discharge the contents of the casing, of a fixed guide-plate 8 beneath the opening 6 and inclined downwardly, an upwardly-inclined chute 17 passing the lower edge of the guide-plate 8, an intercepting means S adapted to arrest the vines but not the nuts, extending from the lower edge of the plate 8 to the opposite side of the chute 17, and a blower B opening into said chute 17 below said intercepting means, substantially as described.

2. In a peanut-picking machine, the combination with the picker comprising a casing 1 having a lateral feed-opening 5 and a discharge-opening 6 in its bottom, of a fixed guide-plate 8 beneath the opening 6 and inclined downwardly, a chute 17 inclined upwardly from the lower edge of the plate 8, an intercepting means S adapted to arrest the vines but not the nuts, and to reciprocate parallel to the lower edge of the plate 8, said intercepting means extending from the lower edge of the plate 8 to the opposite side of the chute 17, an inclined sieve G at the lower end of the chute 17 and extending along the end of said chute, said sieve being movable parallel to the end of the chute and extending to the exterior of the machine, and a blower B comprising a casing having an opening, one side of which opening is adjacent to the lower edge of said plate 8 upon its under side, the other side of the opening being adjacent to the sieve G, substantially as described.

3. In a peanut-picking machine, the combination with the picker comprising a casing 1 having a feed-opening 5 and a discharge-opening 6, of a fixed guide-plate 8 beneath the opening 6 and inclined downwardly, a chute 17 inclined upwardly from the lower edge of the plate 8, an intercepting means S adapted to arrest the vines but not the nuts, and to reciprocate parallel to the lower edge of the plate 8, said intercepting means extending from the lower edge of the plate 8 to the opposite side of the chute 17, an inclined sieve G at the lower end of the chute 17 and extending along the same, said sieve being movable parallel to the end of the chute and extending to the exterior of the machine, an inclined tumbler T consisting of a hollow, rotatable, perforated cylinder having projections upon its interior, the upper end of said tumbler being supported in the frame of the machine and receiving the lower end of said sieve, which projects from the machine, and a blower B comprising a casing having an opening, one side of which opening is adjacent to the lower edge of said plate 8 upon its under side, the other side of the opening being adjacent to the sieve G, substantially as described.

4. In a peanut-picking machine, the combination with the picker comprising a casing 1 having a feed-opening 5 and a discharge-opening 6, of a fixed guide-plate 8 beneath the opening 6 and inclined downwardly, a chute 17 inclined upwardly from the lower edge of the plate, an intercepting means S adapted to arrest the vines but not the nuts, and to reciprocate parallel to the lower edge of the plate 8, said intercepting means extending from the lower edge of the plate 8 to the opposite side of the chute 17, an inclined sieve G at the lower end of the chute 17 and extending to the exterior of the machine, said sieve extending along the lower end of the chute 17 and being movable parallel thereto, an inclined tumbler T consisting of a hollow, rotatable, perforated cylinder having projections upon its interior, the upper end of said tumbler being supported in the frame of the machine and receiving the lower end of said sieve, which projects from the machine, an inclined conveyer C at the lower end of the tumbler, and a blower B comprising a casing having an opening, one side of which opening is adjacent to the lower edge of said plate 8 upon its under side, the other side of the opening being adjacent to the sieve G, substantially as described.

In testimony whereof I have signed my name to this specification in the presence of two subscribing witnesses.

WILLIS R. JONES.

Witnesses:
JOHN I. COFEE,
A. S. BARRETT.